United States Patent [19]

Smoot

[11] Patent Number: 5,115,230
[45] Date of Patent: May 19, 1992

[54] LIGHT-PEN SYSTEM FOR PROJECTED IMAGES
[75] Inventor: Lanny S. Smoot, Morristown, N.J.
[73] Assignee: Bell Communications Research, Inc., Livingston, N.J.
[21] Appl. No.: 643,156
[22] Filed: Jan. 18, 1991

Related U.S. Application Data
[63] Continuation of Ser. No. 381,859, Jul. 19, 1989, abandoned.
[51] Int. Cl.[5] ............................................. G09G 3/02
[52] U.S. Cl. .................................. 340/707; 340/706; 340/709
[58] Field of Search ............... 340/707, 708, 709, 706; 358/107; 434/323, 324, 325, 337

[56] References Cited
U.S. PATENT DOCUMENTS

| 3,183,773 | 5/1965 | Weinstein | 353/42 |
| 3,775,005 | 11/1973 | Szabo | 340/707 |
| 3,885,096 | 5/1975 | Inuiya | 340/709 |
| 4,565,999 | 1/1986 | King et al. | 340/707 |

FOREIGN PATENT DOCUMENTS
2236132 2/1974 Fed. Rep. of Germany ...... 434/325
0230228 11/1985 Japan ................... 340/707

OTHER PUBLICATIONS
Hoffman, "Exact Position Detection with Finger Point and Feedback", IBM (TDB) vol. 23, No. 6, Nov. 1980.

Primary Examiner—Alvin E. Oberley
Assistant Examiner—Xiao M. Wu
Attorney, Agent, or Firm—James W. Falk; Leonard Charles Suchyta

[57] ABSTRACT

A light-pen system for use in connection with a video display installation includes a projector for receiving an externally generated video signal and for projecting a video image onto a screen. Illustratively, the light-pen system includes a source of a beam of radiation for forming a spot at a desired location on the screen. The source of radiation may provide a well collimated visible optical beam or colinear beam of visible and infrared radiation. An adjunct video camera is used to detect the location of the spot on the screen and to produce an output signal indicative of the location of the spot. A host computer or graphics overlay generator receives the position indicative output signal and modifies the externally generated video signal so as to modify the displayed video image.

8 Claims, 3 Drawing Sheets

LIGHT-PEN SYSTEM FOR PROJECTED IMAGES

RELATED APPLICATION

This application is a continuation of application Ser. No. 07/381,859, filed Jul. 19, 1989, now abandoned.

U.S. patent application Ser. No. 237,501, now U.S. Pat. No. 4,890,314 entitled TELECONFERENCE FACILITY WITH HIGH RESOLUTION VIDEO DISPLAY, and filed for T. H. Judd and L. S. Smoot on Aug. 26, 1988, is assigned to the assignee hereof and contains subject matter related to the subject matter of the present application. The contents of this patent application are incorporated herein by reference.

FIELD OF THE INVENTION

The present invention relates to a light-pen system which is suited for remotely interacting with images projected onto a screen. The light-pen system is especially useful in connection with teleconferencing systems which utilize large screen, rear projected video displays.

BACKGROUND OF THE INVENTION

Conventional light-pen devices are designed to operate in close proximity to video display screens. The conventional light-pen is a passive (i.e. non-light-emitting) device. It receives the light radiated from a small patch of the display screen—i.e. the light from the area of the screen the pen is directly over—and includes circuitry for generating an electrical signal only when that light is present.

Typically, the display screen is a raster scanned display device so that only a small portion of the display screen emits light at any given time. In this case, a video information generator (e.g. a host computer's video display controller) connected to the display device has knowledge of the particular portion of the screen being displayed at any time. Thus, circuitry associated with the display can use the light-pen's electrical output signal to determine which part of the display the light-pen is presently being held over. The light-pen/display controller circuitry can then act on this positional information, for example, to display a cursor at the current pen location. Alternatively, the positional information can be used by a host computer (i.e. the host computer generating the video image) to cause screen displayed objects such as windows to react.

The conventional light-pen device described above is suitable for operation in close proximity to small scale raster scanned display screens. However, the above-described conventional light-pen device is not suitable for use with large-screen projected video images, whereby a user would point at the screen from large distances using a light-pen device.

There are a number of significant problems which prevent the use of conventional light-pen devices at substantial distances from large screen projected images. Such large screen projected images are generally formed by projection devices which project light onto the rear surface of a translucent screen. The image is observed by viewing the front surface of the translucent screen. In order to prevent pointing ambiguity, a conventional light-pen device should receive light from only a small patch of the viewing screen. Since the light from the screen surface spreads isotropically, a telescopic arrangement would be required to collect the light from a small screen patch for use by a conventional light-pen device located at a large distance from the screen. The light that would be collected by such a telescopic arrangement is only the small fraction of the total light which is launched in the direction of the light-pen device. Since the amount of screen light from a projected image is small, the sensitivity of a conventional light-pen for use at large distances from a large screen projected image display would generally be inadequate. Furthermore, a light-pen device sensitive enough to respond to a small patch of screen light emitted several feet away may be easily interfered with by normal room light or other light interference. For these reasons, conventional light-pen devices are not suitable for use with large screen projected image displays and especially with large screen, rear projected video image displays.

In view of the foregoing, it is an object of the present invention to provide a light-pen system which is suitable for use with large screen projected image displays and especially large screen, rear projected video image displays.

SUMMARY OF THE INVENTION

In accordance with an illustrative embodiment of the present invention suitable for use with a rear projected video image display, the conventional passive (non-light-emitting) light-pen device is replaced by an active hand-held laser pointer. In conjunction with this laser pointer, one or more adjunct video cameras are placed behind the projection screen and facing towards it to view as much of the rear surface of projection screen surface as is desired for interaction with the laser pointer including up to the entire screen surface.

A narrow-band optical filter is placed in front of the adjunct camera(s) to protect against camera pickup of light which is backscattered from the rear surface of the projection screen. The filter is chosen to pass light with a high level of transmissivity at the wavelength of the laser pointer and to reject light at all other wavelengths. When the laser pointer is pointed at the front surface of the projection screen, an intense spot of light against a dark background is available to the adjunct camera due to the transmission of laser light, front-to-back, through the translucent projection screen and narrow-band optical filter.

The video output from the adjunct camera is passed through a threshold detector which generates a strobe signal corresponding to the X-Y position information of the spot image in the adjunct camera raster. This information can be related by a host computer to the coordinates of objects in the projected image and used to display a cursor at the present laser pointer spot location on the display screen or used to interact with screen objects such as windows or pull down menus.

In an alternative embodiment of the inventive light pen system, the hand held laser pointer is augmented by a wide beam light source which may be an infrared source. Sensors which detect the radiation emitted from the wide beam light source are illustratively mounted on the top and bottom of the screen. The electrical outputs of these sensors are connected to the host computer which controls the display of the video image on the screen. In the manner described above, the laser pointer is used in connection with the adjunct camera(s) to display a cursor at a particular location on the screen. The wide beam light source may then be selectively activated to send, via the screen mounted sensors, a signal to the host computer. This signal causes an object on the screen which is coincident with the cursor to move as the laser pointer and cursor are moved, or to react in other ways to the position of the cursor.

In another alternative embodiment of the invention, particularly applicable to extremely high projector backscatter or ambient light conditions, the adjunct camera and narrow-band optical filter may be replaced by an infrared video camera. In conjunction with the infrared camera, the laser pointer visible laser source is augmented with a colinearly projected infrared laser source. Using this system, the visible radiation backscatter from the projection equipment or any other visible ambient light is completely ignored by the infrared adjunct camera and only the optical spot from the infrared portion of the dual beam (visible and infrared) laser pointer is seen by the adjunct camera. The electrical output of the infrared adjunct camera is the same as the electrical output of the visible light adjunct camera described above and can be used by a host computer to control the video display.

It is an important advantage of the above-described inventive light-pen system that a user has immediate feedback as to the location on the screen at which the laser pointer is aimed because of the laser light spot visible on the front surface of the display. This feedback is instantaneous and is not dependent on the processing time of the video image detected by the adjunct camera. Thus, accurate and precise pointing is easily achieved.

It is also an advantage of the inventive light-pen system that it can be used in conjunction with teleconferencing systems which utilize large screen projected video images. In such a teleconferencing system, a single image may be displayed to conference participants at several remote locations. A participant at one location can use the inventive light-pen to display a cursor at all the locations for ease of explanation, for example, during a symposium, or, for example, to manipulate the displayed image at all remote locations simultaneously.

BRIEF DESCRIPTION OF THE INVENTION

FIG. 1 schematically illustrates a light-pen system for use in conjunction with a large size, rear surface video image projection system, in accordance with an illustrative embodiment of the present invention.

FIG. 2 schematically illustrates a modification of the light pen system of FIG. 1 in which screen objects can be manipulated, in accordance with an illustrative embodiment of the present invention.

FIG. 3 schematically illustrates an alternative light-pen system for use in conjunction with a large size, rear surface video image projection system, in accordance with an alternative illustrative embodiment of the present invention.

Like elements in FIGS. 1, 2 and 3 have the same identifying numerals.

DETAILED DESCRIPTION OF THE INVENTION

Figure 1:
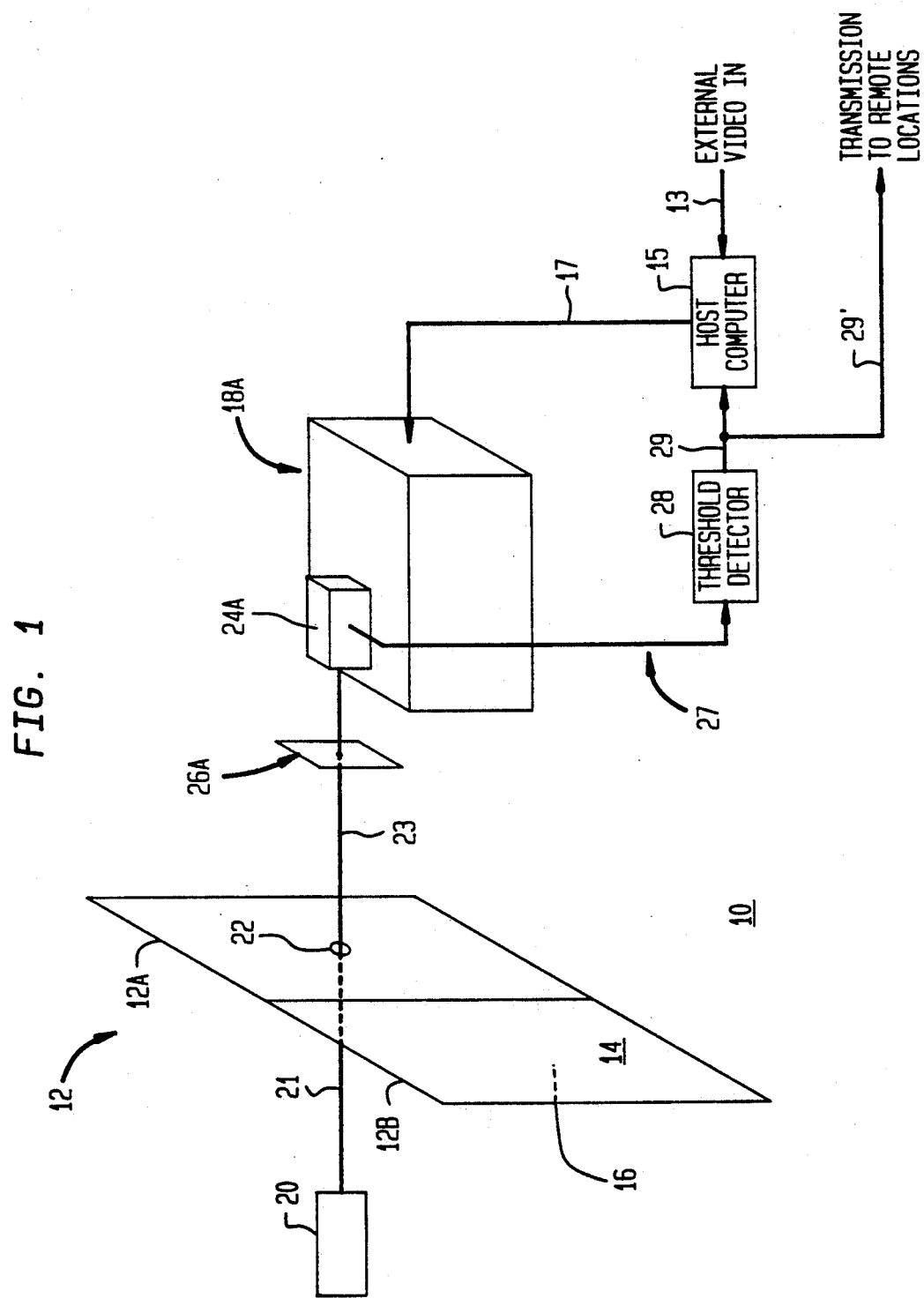

A light-pen system in accordance with the present invention for use in conjunction with a large size rear surface video image projection system is illustrated in FIG. 1.

The video image projection system 10 includes a translucent screen 12. Illustratively, a video image is projected on the rear surface 14 of the translucent screen 12 and is viewed by observing the front surface 16.

Although the light-pen system of the present invention is operable in conjunction with an ordinary rear surface video image projection system, the video system 10 of FIG. 1 is particularly adapted for the display on the screen 12 of a high resolution image.

One technique for forming a high resolution video image involves using two or more cameras (not shown) to produce a video signal with more resolution (i.e. more pixels) than a single camera. In such a system, each camera has a projector (e.g. 18a of FIG. 1) or other display device associated therewith to produce a sub-image which occupies a portion of the resulting high resolution video display.

In FIG. 1, the screen 12 is divided into portions 12a and 12b. Each screen portion displays a sub-image. The sub-images formed on the screen portions 12a, 12b are positioned next to each other to form a single high resolution video image.

In FIG. 1, each sub-image displayed on a screen portion 12a, 12b is formed by a particular projector. In FIG. 1 only one projector 18a is illustrated for forming a sub-image on the screen portion 12a. Another projector for forming a sub-image on the screen portion 12b is not shown in FIG. 1. Each of the projectors projects the video sub-image of an associated remotely located camera onto an associated portion of the screen 12. An external video signal for the projector 18a enters the video system 10 on line 13 and is transmitted via a host computer or other graphics overlay generator 15 and line 17 to the projector 18a for display on the screen portion 12a.

It should be noted that there are several problems associated with the use of a plurality of cameras to produce a single high resolution video image composed of a plurality of individually projected sub-images. One problem is that the plurality of cameras cannot simply be positioned next to each other. Such an arrangement of cameras results in a complicated overlapping of the fields of view of the cameras so that there are some spatial locations which are in the field of view of no camera and some spatial locations which are in the field of view of both cameras. As a result, the sub-images produced by the individual cameras cannot simply be placed adjacent one another to produce a high resolution video image of a particular scene. A further problem is that when sub-images are positioned adjacent one another, there may be combination artifacts such as undesired overlap at the boundaries.

Special arrangements of cameras and/or projectors for solving these problems to form a single high-resolution image composed of a plurality of sub-images are disclosed in the above-mentioned U.S. patent application Ser. No. 237,501 now U.S. Pat. No. 4,890,314.

A light-pen system for use with the rear projection, large screen video system 10 of FIG. 1 utilizes the laser pointer 20. The laser pointer 20 is a conventional hand-held laser device which emits a well-collimated optical beam 21 in the visual portion of the electromagnetic spectrum. A portion of the optical beam from the laser pointer 20 is scattered by the translucent screen 12 so that a viewer of the front surface 16 of the screen 12, including the person holding the laser pointer 20, can see the location or spot 22 on the screen at which the device 20 is pointed.

The remainder of the optical beam from the laser pointer 20 passes through the translucent screen 12 along the path 23 and is detected by an adjunct video camera such as the adjunct video camera 24a. Illustratively, there is one such adjunct video camera associated with each projector such as the projector 18a. Typically, each adjunct video camera has a field of view which coincides with one of the portions 12a, 12b forming the screen 12. Thus, the field of view of the adjunct camera 24a coincides with the translucent screen portion 12a.

A narrow-band optical filter 26a is located between the translucent screen portion 12a and the adjunct video camera 24a. There is one such filter associated with each adjunct video camera. The filter 26a transmits radiation corresponding to the wavelength of the laser pointer 20 and no other radiation. This prevents radiation from the projector 18a which is backscattered from the rear surface 14 of the translucent screen 12 or other ambient light from reaching the adjunct camera 24a. Thus, when the laser pointing device 20 is pointed at the front surface 16 of the screen portion 12a, an intense spot of light is visible to the adjunct camera 24a against a dark background, due to the transmission of laser light, front-to-back, through the translucent projection screen 12 and filter 26a. The dark background is formed by the filter 26a.

The image formed by the spot of laser light is captured on the raster-array of sensors (illustratively CCD sensors) comprising the camera 24a, with each sensor illustratively forming one pixel. Those pixels corresponding to the location of the laser spot are sensitized by the laser spot while the remainder of the pixels remain unsensitized. The raster array of sensors in the camera 24a is read out periodically on the line 27 as a video signal. The video signal is passed to threshold detector 28 which detects the pixels which correspond to the laser spot and generates a signal indicative of the X-Y position of the laser spot. The position indicating signal is transmitted via line 29 to the host computer or graphics overlay device 15 which uses the position information to modify the external video signal received via line 13, so that the video signal transmitted to the projector 18a via line 17 includes, for example, a cursor indicative of the present position of the light spot 22, or so that some other modification of the external video signal takes place such as activation of a display window area.

In teleconferencing applications, it is desirable to transmit via line 29' the position of the laser spot 22 to remote locations when such remote locations are viewing the same image as is shown on the screen 12 in FIG. 1. In this case, a cursor corresponding to the location of the laser spot 22 on the screen 12 can be made to appear on the screen at the remote locations or the video image displayed at the remote locations can be otherwise modified in response to the location of the laser spot 22.

Figure 2:
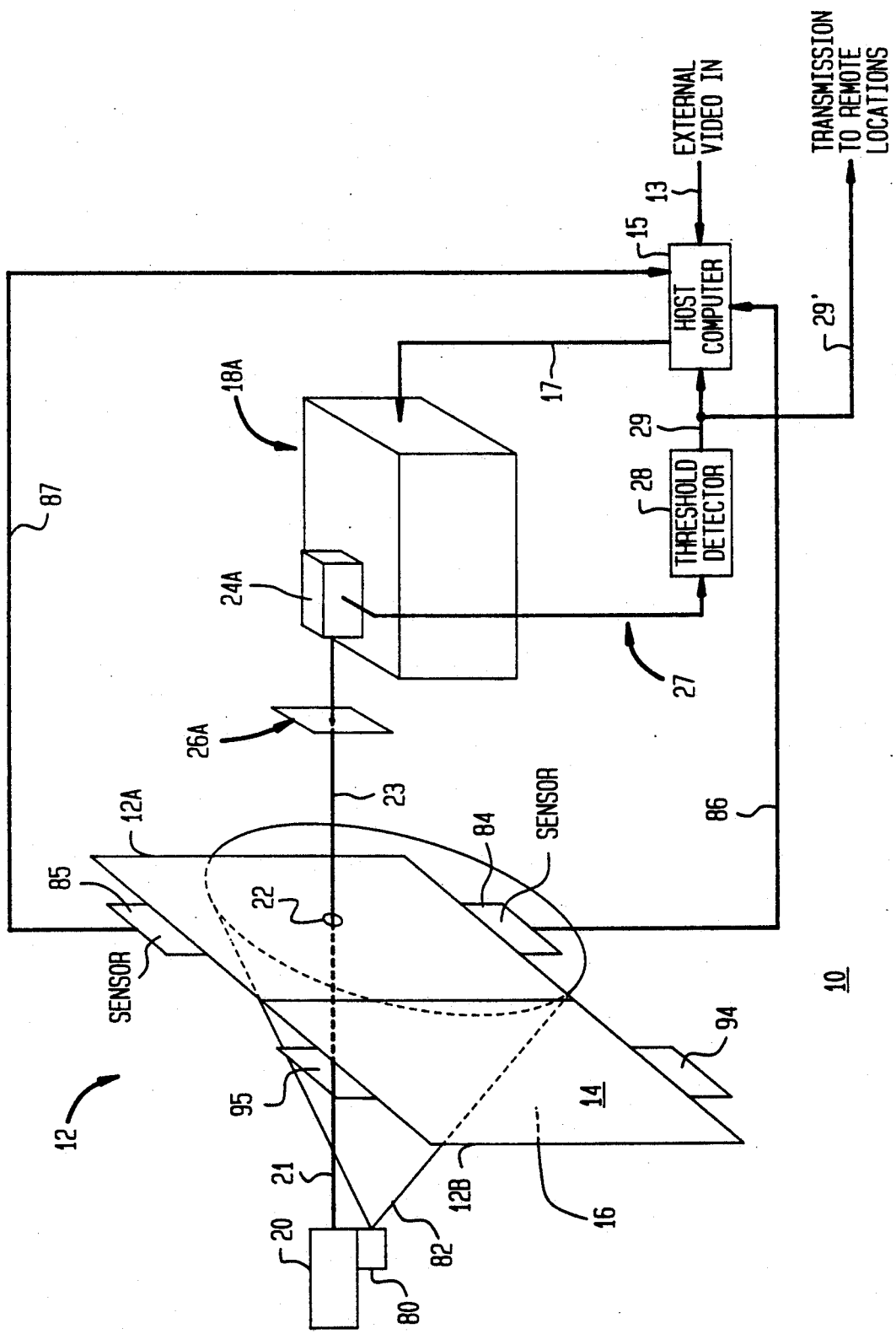

An alternative light-pen system is illustrated in FIG. 2. In FIG. 2 the light-pen system of FIG. 1 is modified to permit easier manipulation of certain objects contained in the screen image. Accordingly, the laser pointer 20 is augmented with the wide-area light source 80. Typically, the wide area light source 80 is an infrared source which produces the wide area beam 82. Such wide area infrared sources are generally found in remote control devices for standard television receivers and generally comprise an infrared emitting LED.

The light-pen system of FIG. 1 is also modified in FIG. 2 so that the sensors 84 and 85 are located on the bottom and top of the screen portion 12a, respectively. The sensors 84 and 85 are connected via the lines 86 and 87, respectively, to the host computer 15. A similar set of sensors 94 and 95 are associated with the screen portion 12b and are connected to a host computer (not shown) which is associated with the screen portion 12b.

The wide beam infrared source 80 is used as follows. Illustratively, as indicated above, the host computer 15 causes a cursor to appear on the screen 12 at the location 22 where the beam 21 produced by the laser pointer 20 intersects the screen. If the user of the laser pointer 20 then activates the wide area source 80, one of the sensors 84, 85 (or 94, 95) will send a signal to the appropriate host computer such as host computer 15. Illustratively, so long as a signal is received from one of the sensors, the host computer 15 will cause a screen object located at the spot 22 to move with, or to otherwise react to, the spot 22 as the user moves the laser pointer device 20. Thus, the reception of light from the wide area source 80 at one of the sensors 84, 85, 94, 95 activates the above-described screen manipulation feature by transmission of a signal via a line such as line 86 or 87 to a host computer such as host computer 15. Preferably, the position of the sensors 84, 85, 94, 95 are chosen so that regardless of the location of the spot 22 on the screen, the wide area beam 82 will intersect one of the sensors when the wide beam source 80 is activated. Illustratively, the above-described screen manipulation feature is deactivated when the source 80 is turned off.

As indicated previously, for example, when the wide area source 80 is not utilized, the host computer 15 modifies the external video signal so that a cursor is displayed at the location of the spot 22. When the wide area source 80 is utilized, the wide area source is detected by at least one of the sensors 84, 85, 94, 95, which sensors transmit a signal to the host computer 15. When the signal from a sensor 84, 85, 94, 95 is received, the way in which the host computer modifies the external video signal is changed. For example, instead of just displaying a cursor at the spot 22, when a signal is received from a sensor 84, 85, 94, 95, there is a different modification of the video signal such as, for example, moving an object in the video image coincident with a laser spot 22 and a corresponding cursor.

Figure 3:
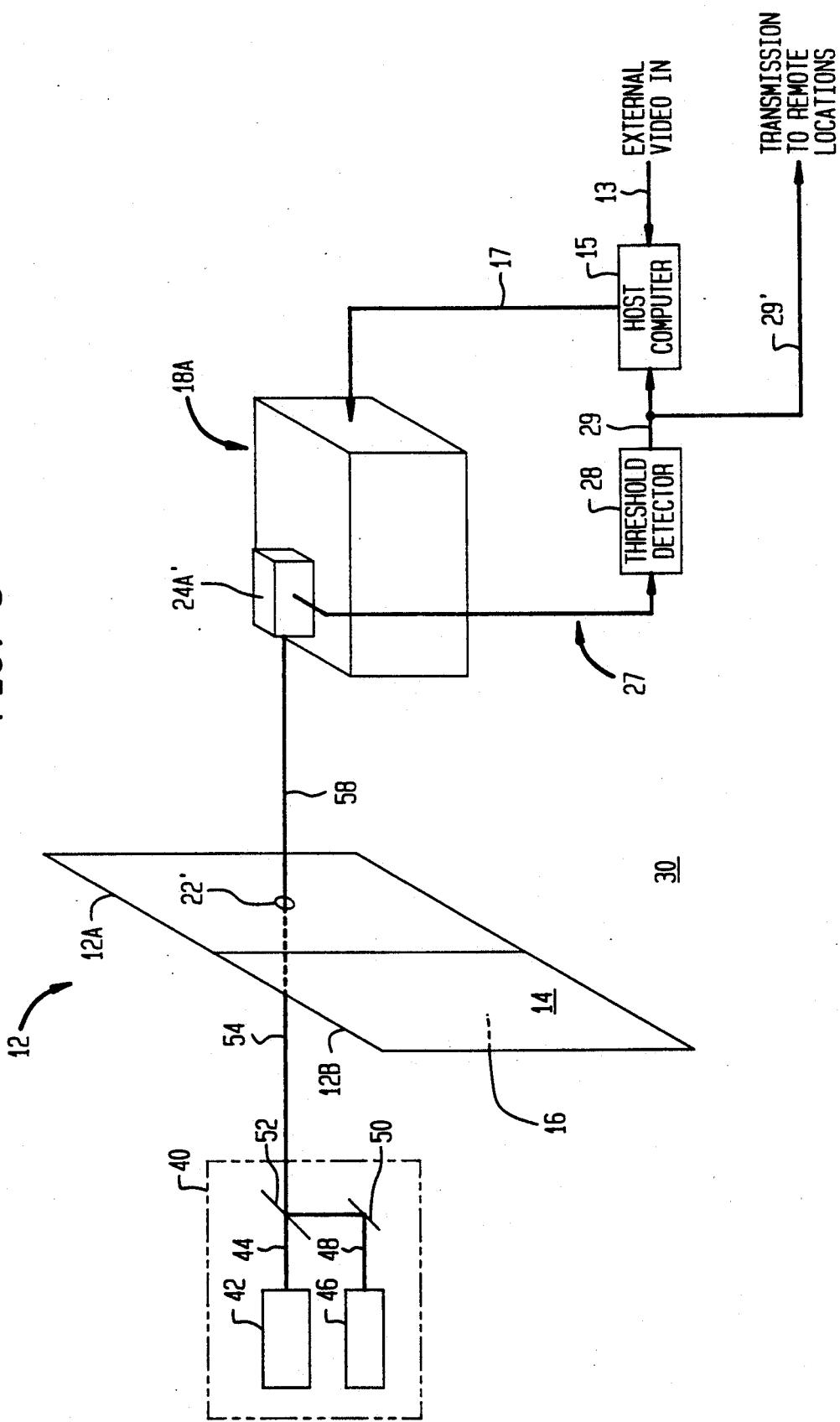

Another alternative embodiment of a light-pen for use in conjunction with a large size, rear surface video projection system is illustrated in FIG. 3. The video image projection system 30 of FIG. 3 is identical to the video image projection system 10 of FIG. 1 except that the adjunct video camera 24a is replaced by the infrared video camera 24a' so that the optical filter 26a of FIG. 1 is eliminated. In addition, the laser pointing device 20 of FIG. 1 which emits a collimated beam of radiation 21 in the visible region of the electromagnetic spectrum, is replaced by the laser pointing device 40.

The laser pointing device 40 includes the laser 42 which emits a well-collimated beam of light 44 in the visible portion of the electromagnetic spectrum. The laser pointing device 40 also includes the infrared laser 46 which produces the well-collimated infrared beam 48. The well-collimated visible beam 44 and the well-collimated infrared beam 48 are combined using the mirror 50 and the beam combiner 52 to form the beam 54 which is composed of colinear beams of visible and infrared radiation.

The visible portion of the beam 54 forms a visible spot 22' on the translucent screen 12 which is visible to all viewers of the front surface 16 of the screen 12 and to the user of the laser pointing device 40. The colinear infrared portion of the beam 54 forms a corresponding "infrared spot" which is detected by the raster array of infrared sensors forming the camera 24a'. In particular, the camera 24a' detects the narrow collimated beam of infrared radiation passing through the translucent screen 12 from front to back along the path 58. Thus, the infrared camera 24a' forms an infrared image of the spot 22'.

The video output signal of the infrared camera 24a' of FIG. 3 on line 27 is functionally the same as the video output signal of the visible light adjunct camera 24a of FIG. 1. The video signal output of the camera 24a' is transmitted to threshold detector 28 which outputs a signal corresponding to the X-Y position of the spot 22' on the screen 12. This position indicating signal is received by the host computer or graphics overlay device 15 via line 29 is used to modify an external video signal received via line 13 before the external video signal is transmitted to the projector 12a via the line 17. As indicated above, the external video signal may be modified, for example, to include a cursor indicative of the present position of the light-pen. The X-Y position information of the spot 22' may be transmitted to remote video display locations via the line 29'. The embodiment of the invention shown in FIG. 3 is especially useful in situations where there is a high level of ambient light or where there is a large amount of backscattered light from the rear surface 14 of the screen 12 as the infrared camera 24a' is not sensitive to such ambient or backscattered light.

It should be noted that although the invention has been described in conjunction with a rear projection video system, the inventive light-pen system can be used in front projection systems wherein the video projectors and adjunct cameras are mounted in front of, rather than behind, the display screen. In addition, it should be noted that the inventive light-pen system can be used in conjunction with images that are not video images. In this case, when the adjunct video camera detects the laser spot at a particular location in a non-video image, particular actions can be triggered, for example, a new image can be displayed.

Finally, the above-described embodiments of the invention are intended to be illustrative only. Numerous alternative embodiments may be devised by those skilled in the art without departing from the spirit and scope of the following claims.

What is claimed is:

1. A light pen system for generating a cursor which forms part of a projected video image, said light pen system comprising:
   projection means for projecting a video image including a cursor onto a screen,
   a source of a collimated beam of radiation for forming a spot at a desired location on said screen,
   position locating means including a video camera for producing an output signal indicative of the location of the spot on the screen,
   processing means for receiving an externally generated video signal, for receiving said output signal from said position locating means, and for modifying said externally generated video signal in response to said output signal of said position locating means to produce a modified video signal capable of forming a video image including a cursor at the location of said spot on said screen, and
   means for transmitting said modified video signal to said projection means to form said video image including said cursor on said screen,
   wherein said light pen system further comprises:
   a source of a wide area beam of radiation, and
   sensing means for sensing the presence of said wide area beam and for transmitting an output signal to said processing means indicative of the presence of said wide area beam,
   said processing means modifying said external video signal in response to said output signal from said position locating means in cooperation with said output signal from said sensing means.

2. The light pen system of claim 1 wherein said position locating means includes a threshold detector for converting a video signal outputted by said camera into said output signal.

3. The light pen system of claim 1 wherein said projection means is located behind said screen and said video image is viewed in front of said screen.

4. The light pen system of claim 3 wherein said video camera is located behind said screen and said source of radiation is located in front of said screen.

5. The light pen system of claim 1 wherein said source produce a beam of radiation in the visible portion of the electromagnetic spectrum and wherein said light pen system further includes a narrow band optical filter for transmitting radiation at the wavelength of said beam, said filter being located between said screen and said video camera.

6. The light pen of claim 1 wherein said source produces a beam of infrared radiation.

7. The light pen of claim 1 wherein said source produces colinear beams of visible and infrared radiation.

8. The light pen system of claim 1 wherein said light pen system further comprises means for remotely transmitting the location of said spot.

* * * * *

UNITED STATES PATENT AND TRADEMARK OFFICE
CERTIFICATE OF CORRECTION

PATENT NO. : 5,115,230

DATED : May 19, 1992

INVENTOR(S) : Lanny S. Smoot

It is certified that error appears in the above-identified patent and that said Letters Patent is hereby corrected as shown below:

Column 1, line 8, "Pat. No. 4,890,314" should read --Pat. No. 4,820,314--.

Signed and Sealed this

Thirtieth Day of November, 1993

Attest:

BRUCE LEHMAN

Attesting Officer

Commissioner of Patents and Trademarks